(12) United States Patent
Zelazowski

(10) Patent No.: US 9,081,211 B2
(45) Date of Patent: Jul. 14, 2015

(54) MAGNETIC HINGE

(71) Applicant: Phyzics Properties Inc., Pittsburgh, PA (US)

(72) Inventor: Dennis G. Zelazowski, Pittsburgh, PA (US)

(73) Assignee: Physzics Properties Inc., Pittsburgh, PA (US)

( * ) Notice: Subject to any disclaimer, the term of this patent is extended or adjusted under 35 U.S.C. 154(b) by 127 days.

(21) Appl. No.: 13/668,543

(22) Filed: Nov. 5, 2012

(65) Prior Publication Data

US 2013/0114039 A1    May 9, 2013

Related U.S. Application Data

(60) Provisional application No. 61/555,188, filed on Nov. 3, 2011.

(51) Int. Cl.
  *G02C 5/22*    (2006.01)

(52) U.S. Cl.
  CPC .......... *G02C 5/2209* (2013.01); *G02C 2200/02* (2013.01)

(58) Field of Classification Search
  CPC ...... G02C 5/2209; G02C 5/22; G02C 5/2254; G02C 2200/02; G02C 9/02
  USPC ..................... 351/153, 116, 111, 41, 158, 121
  See application file for complete search history.

(56) References Cited

U.S. PATENT DOCUMENTS 3,388,418 A * 6/1968 Bey ................................ 16/320
  2012/0062831 A1 * 3/2012 Sierra et al. .................... 351/121

* cited by examiner

*Primary Examiner* — William Choi
*Assistant Examiner* — Sharrief Broome
(74) *Attorney, Agent, or Firm* — Cohen & Grigsby, P.C.

(57) ABSTRACT

A magnetic hinge (24) having a magnet (68) that is rotatably connected to frame front (14) or temples (18, 19) of eyewear (10). Magnet (68) has a contact surface that cooperates with a magnetically reactive body (76) and can be secured in a housing (34) that is rotatably connected to eyewear (10) by protrusions (60, 62).

17 Claims, 16 Drawing Sheets

MAGNETIC HINGE

CROSS-REFERENCE TO RELATED APPLICATION

This application claims the benefit of U.S. Provisional Application No. 61/555,188, filed on Nov. 3, 2011, which is incorporated herein by reference in its entirety.

BACKGROUND OF THE INVENTION

1. Field of the Invention

The disclosed invention relates to magnetic hinges and, more particularly, magnetic hinges that are used in eyewear.

2. Discussion of the Prior Art

Conventional eyewear is subject to damage from impacts arising from daily activities. For example, eyewear in which the frame front and the temple bars are connected by conventional screw-type hinges are subject to breakage, deformation, and/or metal fatigue. Such damage can render the eyewear useless or subject the wearer to physical discomfort, such as when the eyewear becomes misshapen or ill-fitting causing it to slip down the nose or exert undue pressure behind the ear or on the side of the face. Additionally, the hinge screws connecting the frame front and the temple bars are sometimes loosened and even can be lost. The screws are very small and are difficult to handle and replace, making repair tedious and time-consuming.

SUMMARY OF THE INVENTION

In accordance with the disclosed invention, a magnetic hinge includes a magnet that is rotatably mounted in either the front frame or the temple of eyewear. The magnet has a contact surface and cooperates with a magnetically responsive body that is secured to the other of the front frame or the temple to which the magnet is not mounted. The magnetically responsive body has a surface that engages the contact surface of the magnet while the magnet holds the magnetically responsive body to the magnet. In this way, the magnetic hinge pivotally connects the frame front and the temple.

Preferably, the magnetic hinge includes a first housing that secures the magnet. The first housing is includes a top panel and a bottom panel that are oppositely disposed from each other and that secure the magnet between the top and bottom panels. The first housing secures and positions the magnet in alignment with the pivot axis of the front frame and the temple as they pivot between open and closed positions.

Also preferably, the first housing is rotatably connected to the front frame or the temple of the eyewear by oppositely disposed protrusions or equivalent rotational points such as axles, rivets, or cut-outs. The protrusions establish an axis of rotation for the magnet.

Most preferably, the rotation of the magnet is limited to about ninety degrees by several stop structures such as ledges or pyramidal or square shape protrusions that fit together in nesting relationship, one-inside-the other. When the temple is in the closed or open position, the double pyramidal indents are substantially engaged so that they make contact on each side of the connecting faces. When the temple and front frame are pivoted to open or close positions, the pyramidal structures disengage so that the housing can rotate. Friction, tension, and spring-like characteristics result by the use of this structure. In one embodiment, the first housing has two pyramidal indents in flexible panels on the top and the bottom of the first housing. These flexible panels (in conjunction with the square/pyramidal protrusions) can segment and stage the rotation of the hinge in about ninety degrees at the 'open' position and about zero degrees in the 'closed' position. In the 'transitional' phases, i.e. opening/closing, or going beyond about ninety degrees, the protrusions disengage from the flexible panels of the first housing.

Other features, advantages and objects of the presently disclosed invention will become apparent to those skilled in the art as a description of several presently preferred embodiments thereof proceeds.

BRIEF DESCRIPTION OF THE DRAWINGS

Several presently preferred embodiments of the disclosed invention are described in connection with the accompanying drawings in which.

DESCRIPTION OF PRESENTLY PREFERRED EMBODIMENTS

A magnetic hinge assembly for attaching members of eyewear together is disclosed, as shown in various embodiments illustrated in FIGS. 1 through 13F. The magnetic hinge assembly eliminates the need for screws and similar fasteners that have been used in the prior art to connect members of eyewear. The magnetic hinge tends to avoid or minimize the risk of breakage due to metal fatigue, bending, misfitting eyewear. New eyewear can be designed and manufactured to include the magnetic hinge. Alternatively, existing eyewear with conventional screw-type fasteners may be retrofitted to include the magnetic hinge. Retrofitting involves detaching the traditional screw-and-barrel type hinge, and placing magnetic adaptors at both ends, creating a new magnetic hinge closure.

Figure 6:
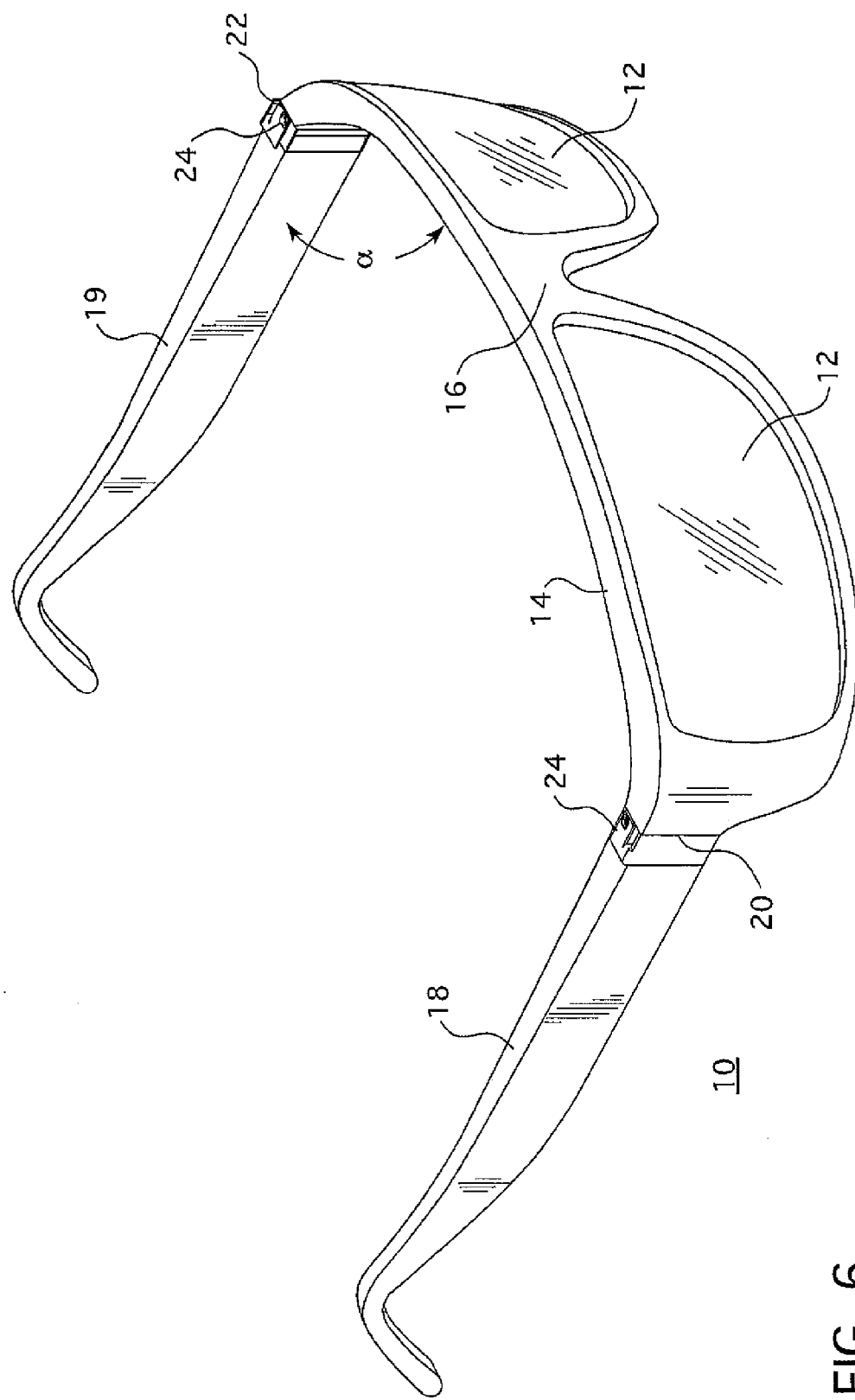
FIG. 6 is a perspective view of a pair of eyewear including the magnetic hinge assembly shown in FIG. 1 with the temple bars in the open position.
Figure 7:
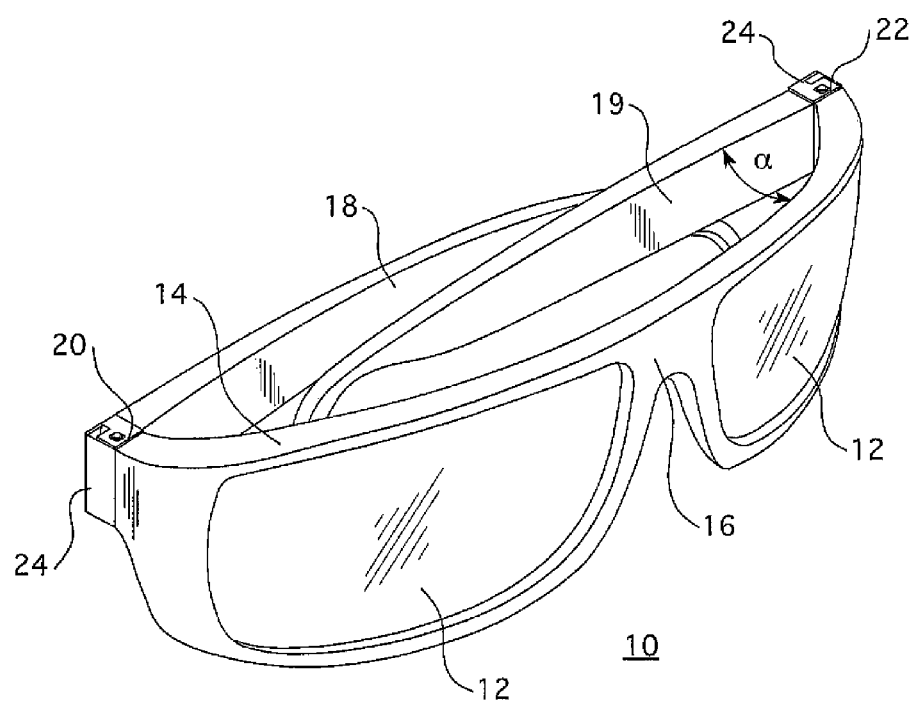
FIG. 7 is a perspective view of a pair of eyewear including the magnetic hinge assembly shown in FIG. 1 with the temple bars in the closed position.

With particular reference to FIGS. 6-7, eyewear includes a frame 10 and one or more lenses 12. The frame 10 includes a frame front 14 that supports the lenses 12, a nose bridge 16, and a pair of temple bars 18, 19. Each frame front has first and second end regions 20, 22 that may be integral with the frame front or may be attached to the frame front by glue, solder, screws, or the like. First and second temple bars 18, 19 are detachably connected to first and second end regions 20, 22 of frame front, respectively, by a magnetic hinge assembly 24, embodiments of which are shown in FIGS. 1 through 13F.

As described in greater detail below, each magnetic hinge assembly 24 permits at least partial rotation of at least one of the frame front 14 or the corresponding temple bar 18, 19 about an axis such that the temple bar pivots between an open position illustrated in FIG. 6 and a closed position illustrated in FIG. 7. In some cases, the temple 18, 19 is pivoted away from frame front 14 from the closed position and beyond the open position to an angular position in which the temple is hyperextended past the normal open position.

As shown in FIGS. 1-5, the hinge assembly 24 includes a magnet 26 that moves in unison with the temple 18, 19. The magnet 26 moves relative to the frame front 14. Alternatively, a magnet 28 can be secured in fixed relation to the frame front 14 and a magnet 30 is rotatably secured to the temple 18, 19. In that case, magnet 28 stays fixed with respect to frame front 14 while magnet 30 that is on the temple part is the one that rotates. As another alternative, both ends have rotatable magnet parts.

The standard symmetrical direction provides, at maximum, the standard ninety degrees of angular movement. In an alternative configuration, one range of rotation is reversed to provide additional fit and sizing adjustments such as widening or shortening frame front 14 and temples 18, 19 of the frame or providing for pivotal movement of the temple bars 18, 19 to the hyperextended position in which the included angle between frame front 14 and one of temples 18, 19 is greater than 90 degrees.

With reference to FIGS. 1-5, magnetic hinge assembly 24 has first housing 34 and second housing 32. Second housing 32 has opposed first and second end walls 36, 38. One or more side walls 40 are positioned between first and second end walls 36, 38 and are substantially perpendicular thereto. First and second end walls 36, 38 and side walls 40 define a first compartment 42. Optionally, second housing 32 is made from any metal such as titanium, nickel, steel, beryllium, gold, silver; any suitable plastic such as zyl, acetate cellulose, polycarbonate, or TR90; or a renewable material such as horn, wood, stone, crystal, or bone.

Second housing 32 is integral with or attached to one of frame front 14 or temples 18, 19 of the eyewear. In the embodiments shown in FIGS. 1-5, second housing 32 is attached to or integrally connected to an end region 20, 22 of frame front 14. Alternatively, second housing 32 can be attached to or integral with an end portion of temple bar 18, 19. Second housing 32 is made integral to the frame front 14 or temple bar 18, 19 by any of mechanical interlocking, pressure or friction fit mounting, adhesive/glue, or bolts/screws. Frame front 14 or temple 18, 19 can also be attached by softening the metal or plastic part and merged into compartment 42 of second housing 32. In this merger, second housing 32 may include structure such as recesses, dimples, tongue-groove, or ridging to secure second housing 32 to frame front 14 or temple 18, 19.

As shown in FIGS. 1-5, first housing 34 has opposed first and second end walls 44, 46. One or more side walls 48, 50 are positioned between first and second end walls 44, 46 and are substantially perpendicular thereto. First and second end walls 44, 46 and side walls 48, 50 define a second compartment 53. First housing 34 is rotatably connected to second housing 32 so that first housing 34 turns in carrousel fashion with respect to second housing 32. First housing 34 is positioned so that end walls 44, 46 of first housing 34 are substantially parallel to end walls 36, 38 of second housing 32, respectively, and side walls 48, 50 of first housing 34 are substantially parallel to side walls 40 of second housing 32, respectively.

Figure 1:
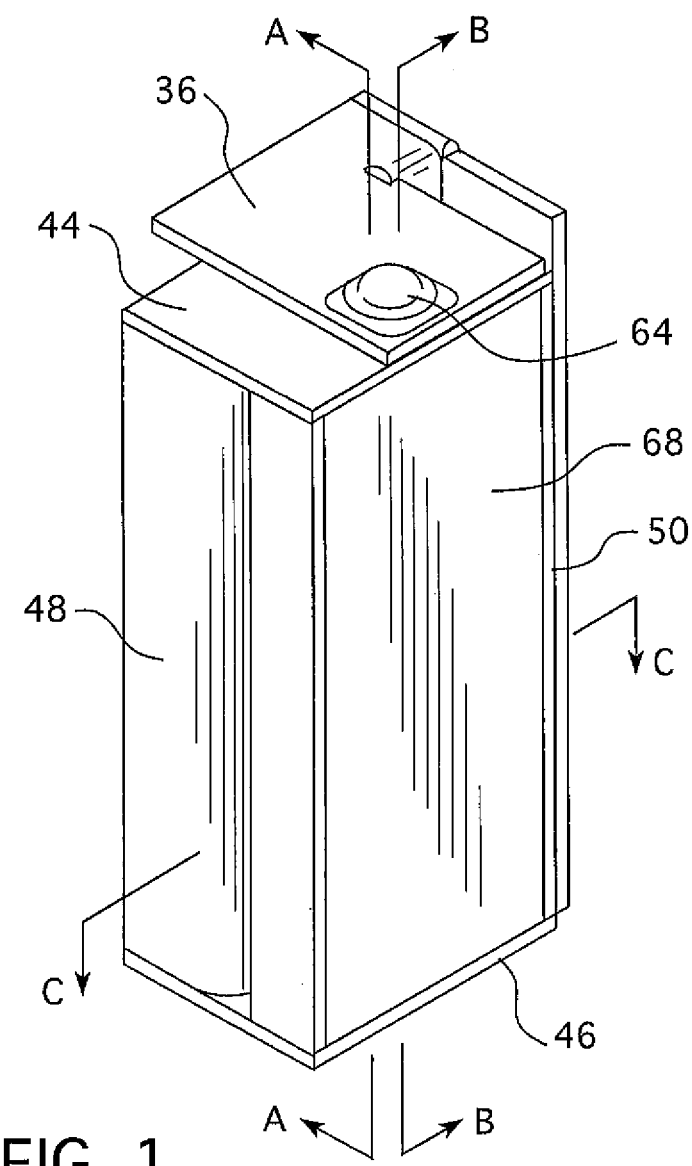
FIG. 1 is a perspective view of an embodiment of a magnetic hinge assembly.
Figure 2:
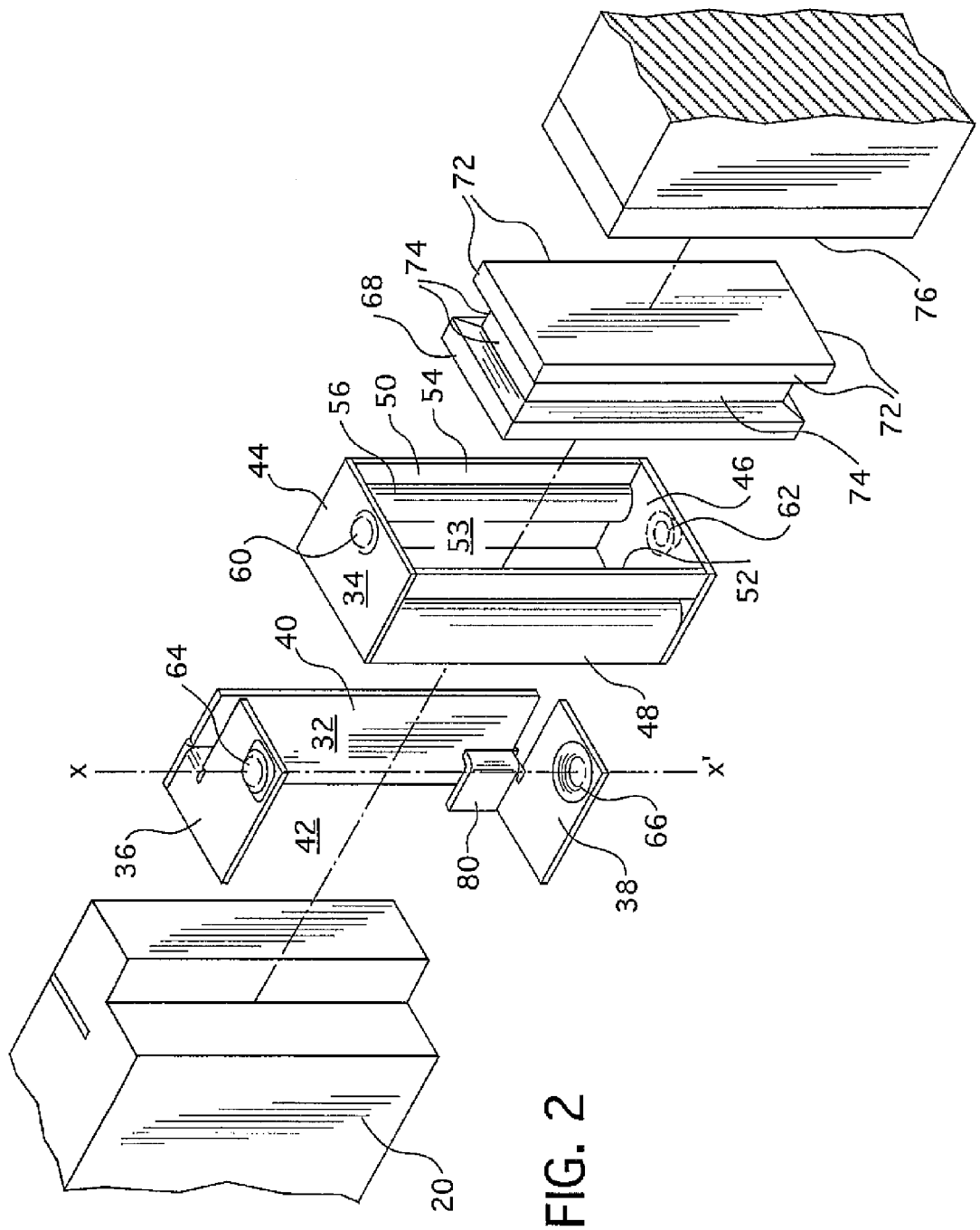
FIG. 2 is an exploded view of the magnetic hinge assembly shown in FIG. 1 as applied to eyewear.
Figure 3:
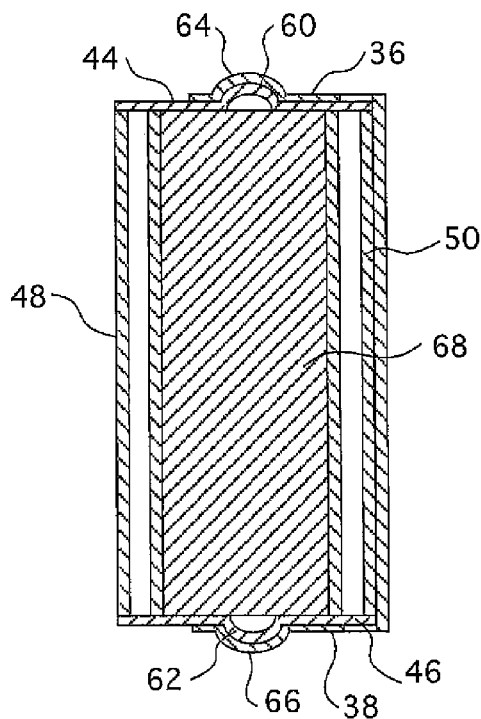
FIG. 3 is a cross-sectional view of the magnetic hinge shown in FIG. 1 taken along line A-A of FIG. 1.
Figure 4:
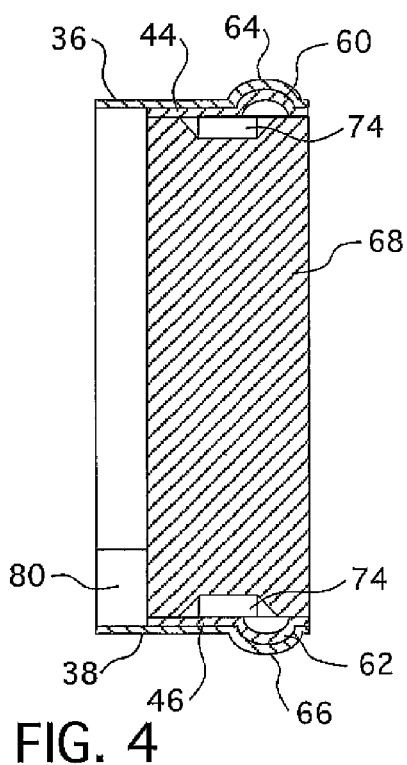
FIG. 4 is a cross-sectional view of the magnetic hinge shown in FIG. 1 taken along line B-B of FIG. 1.
Figure 5:
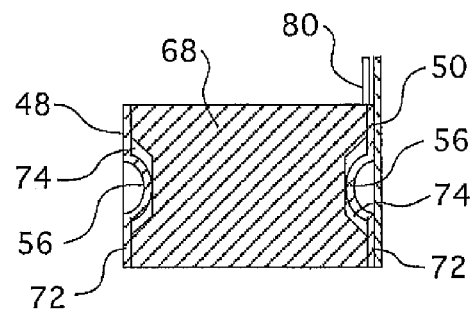
FIG. 5 is a cross-sectional view of the magnetic hinge shown in FIG. 1 taken along line C-C of FIG. 1.
Figure 5A:
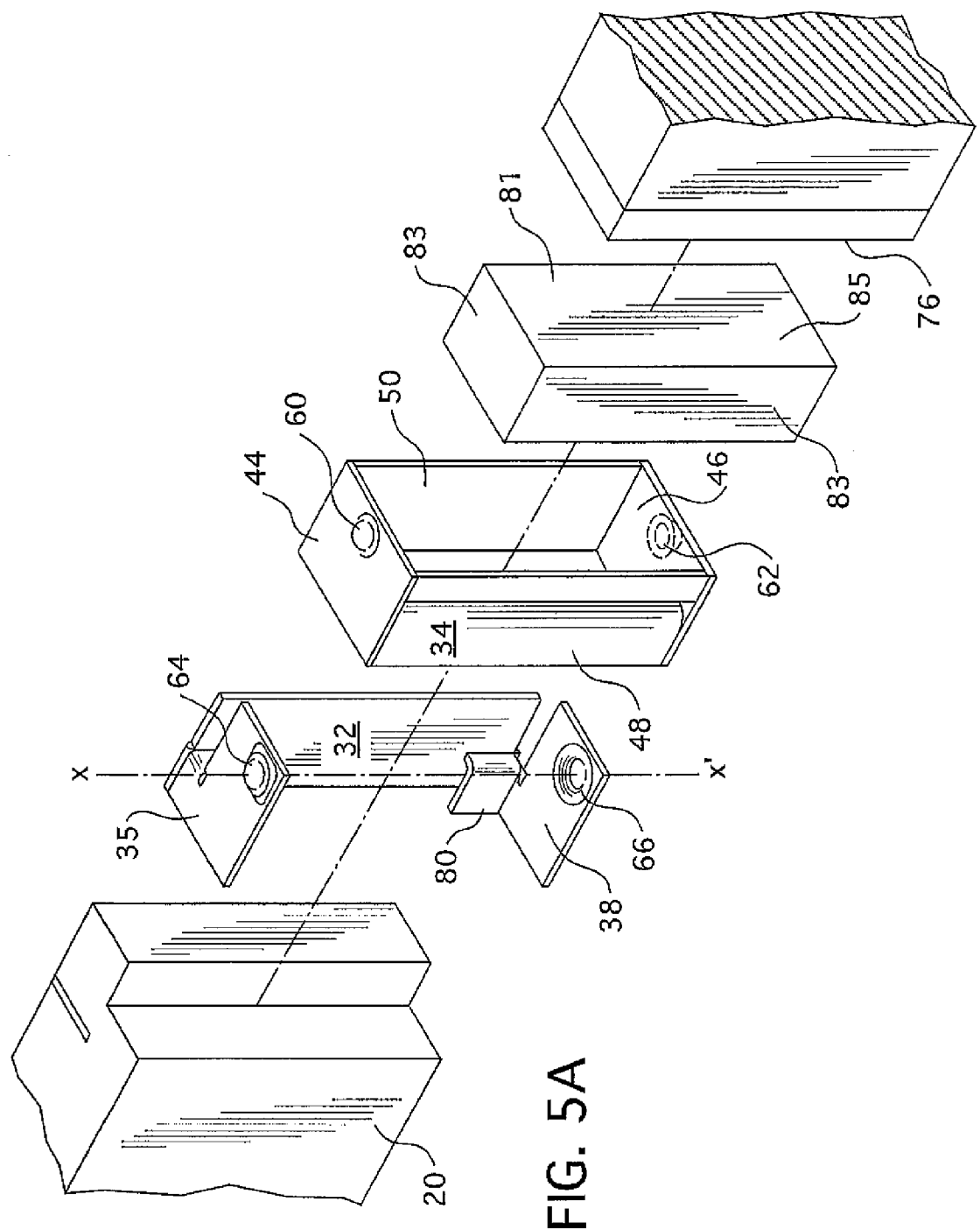
FIG. 5A is an exploded view of an alternative embodiment of the disclosed magnetic hinge assembly as applied to eyewear.

In the embodiment of FIGS. 1-5, at least a portion of the one or more side walls 48, 50 of first housing 34 projects into the second compartment 53. As shown in FIGS. 1-5, side walls 48, 50 of first housing 34 include a ridge 56 that is integral with or attached to an inner face 52, 54 of at least one of the side walls 48, 50 of first housing 34. Ridge 56 may be attached to the inner face 52, 54 of one of the side walls 48, 50 of the first housing by glue, solder, or the like. Alternatively, as shown in FIG. 5A, the inner face 52, 54 of each of the side walls 48, 50 of first housing 34 is substantially flat.

Magnetic hinge assembly 24 also has means for rotation that enables first housing 34 to rotate about an axis with respect to second housing 32. In the embodiment of FIGS. 1-5, the means for rotation is a protrusion 60, 62 that is respectively formed in each of the end walls 44, 46 of first housing 34. Protrusions 60, 62 substantially align with and engage a respective recess 64, 66 in the opposed end walls 36, 38 of second housing 32. Recesses 64, 66 define negative spaces that complement the shape of protrusions 60, 62 so that protrusions 60, 62 engage recesses 64, 66 respectfully. Protrusions 60, 62 and recesses 64, 66 are substantially aligned along axis $\chi$-$\chi'$. Alternatively, protrusions 60, 62 may be any shape including, for example, conical, pyramidal, hemispherical, or cylindrical.

Figure 5B:
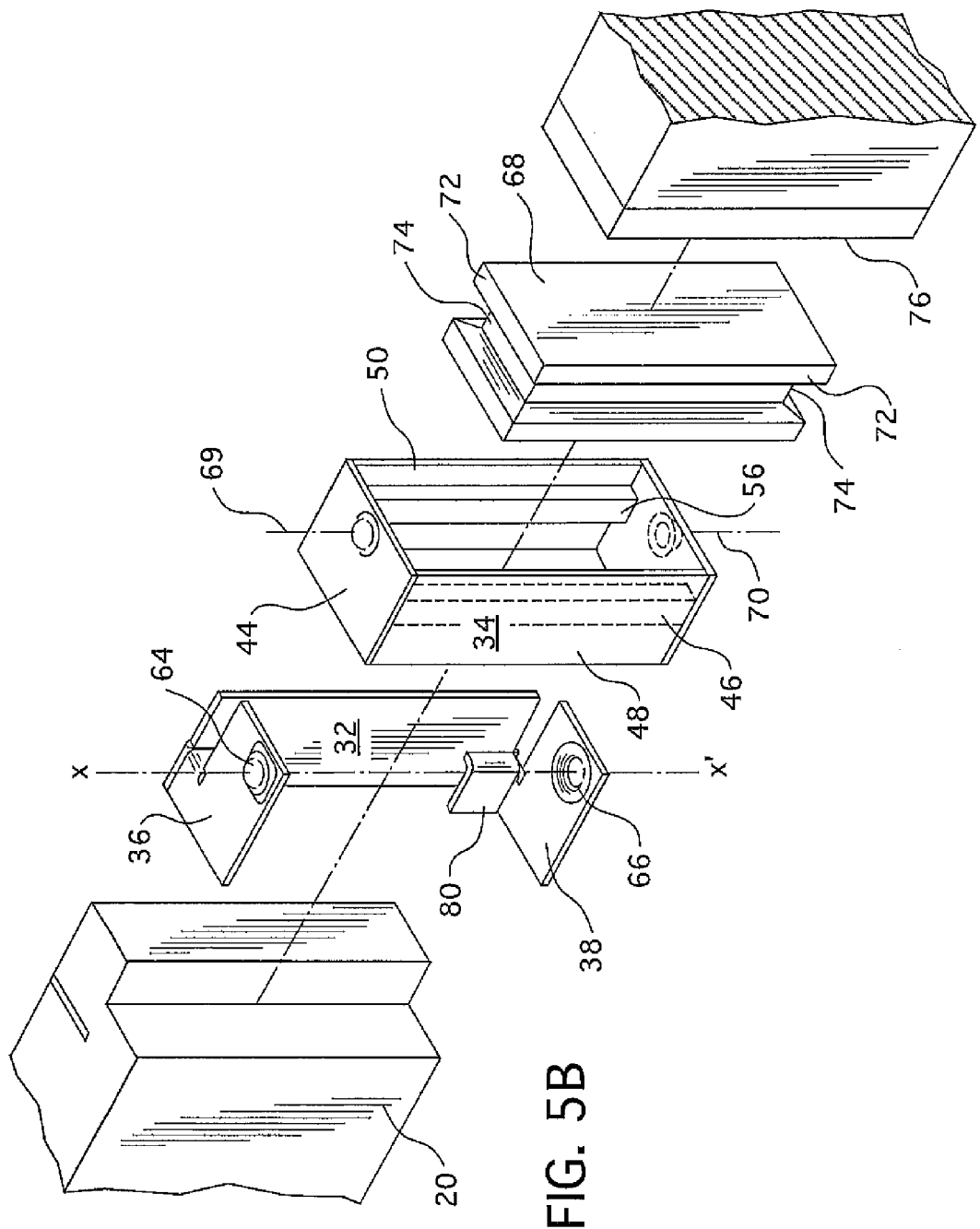
FIG. 5B is an exploded view of another alternative embodiment of the disclosed magnetic hinge assembly as applied to eyewear.

As shown in FIG. 5B, alternative means for rotation comprise a pair of pins 69, 70, each pin of the pair extending from an outer face of a respective end wall 44, 46 of first housing 34 and configured to engage recess 64, 66 in the oppositely facing end wall 36, 38 of second housing 32. Pins 69, 70 and recesses 64, 66 also are substantially aligned along axis $\chi$-$\chi'$.

As shown in FIGS. 1-5, magnetic hinge assembly 24 has a first magnet 68 for attachment to a magnetically reactive surface. First magnet 68 is at least partially housed in compartment 53 of first housing 34 and has dimensions that are slightly smaller than those of compartment 53. Optionally, first magnet 68 includes multiple magnets that are magnetically attracted together, with at least a portion of one or more of the magnets being housed in the compartment 53 of first housing 34. The side perimeter 72 of magnet 68 defines a groove 74 for receiving the ridges 56 of side walls 48, 50 of first housing 34 to secure magnet 68 in first housing 34.

In an alternative embodiment of FIG. 5A, the perimeter walls 83 of magnet 81 are substantially planar and magnet 81 is secured in compartment 53 by adhesive, glue, mechanical interlocking, pressure or friction fit mounting, bolts/screws. Magnet 81 has a contact face 85 that contacts a magnetically reactive surface.

In another embodiment, magnet 68 is secured in compartment 53 by softening the metal or plastic body of first housing 34 and merging magnet 68 into compartment 53 of first housing 34. End walls 44, 46 and side walls 48, 50 of first housing 34 could extend beyond the perimeter walls of magnet 68, to provide a socket-like fit of the magnets together.

Magnet 68 attaches to a magnetically reactive element 76 that is secured to the frame front 14 or the temples 18, 19. The magnetically reactive element 76 can be integral with, or embedded in the frame front 14 or the temples 18, 19 such that when the eyewear is assembled, the frame front 14 and temples 18, 19 are attached by means of magnetic attraction between magnet 68 and magnetically reactive element 76. Magnetically reactive element 76 is a second magnet or a piece of magnetically reactive material such as a ferrous material, a crystalline material, or any other magnetic material. In the embodiment shown in FIGS. 1-5, magnetically reactive element 76 is attached to, embedded in, or integral with an end portion of temple bar 18, 19. Alternatively, magnetically reactive element could be attached to or embedded in an end region 20, 22 of frame front 14.

Optionally, magnet 68 is a neodymium magnet. In various embodiments, magnet 68 can be rectangular or semi-cylindrical. In still other embodiments, magnet 68 can be square, triangular, conical, spherical or hemispherical. Optionally, magnets have an attractive force of about 0.45 kJ/d, but that force has a magnetic tolerance of about 25% and may vary depending, for example, on the intended use of the eyewear, and the weight, size, shape, and general design of the frame, lenses, and temple bar. Optionally, the magnets are plated to increase durability, wherein the plating material is nickel, black nickel, sterling silver, or gold. Alternatively, plastic, vinyl, or paint can also be used as cover material.

Optionally, magnetic hinge assembly 24 includes a stop 80 that is positioned in compartment 42 for limiting the range of angular movement of the first housing 34 about axis χ-χ' so that first housing cannot rotate fully about axis. Preferably, the limit of angular rotation is about 90 degrees. Stop 80 may be structured in the form of a ledge, flange, box, abutment, or wall. Stop 80 may be on the flexible panels or rigid panels that define compartment 42, or may be on one of the walls 40 of compartment 42. Stop 80 could also be the structure of the angular relation of the sides of a pyramidal protrusion and/or its combination.

Magnetic hinge assembly 24 permits the end portion of the frame front 14 and temple bar 18, 19 to rotate about axis χ-χ' within a predetermined range of angular motion. In the "open" position, temple bar 18, 19 extends rearwardly from frame front 14 up to an angle α of about ninety degrees. In the "closed" position, temple bar 18, 19 is substantially parallel to frame front 14 and the included angle α is about zero degrees. Magnet 68 and magnetically reactive surface 76 begin to separate from each other when angle α is greater than about 90°. Such separation of magnet 68 and magnetically reactive surface 76 causes frame front 14 and temples 18, 19 of eyewear to detach from each other. When temple 18, 19 disengages from frame front 14, it can move freely in any direction. Temple 18, 19 can be decoupled in response to forces from any direction or combination of directions, preventing any damage to the eyewear and avoiding injury to the person wearing the eyewear. In this way, magnetic hinge 24 avoids damage or breakage caused by force against the eyewear that would tend to place hinge assembly 24 in a hyperextended position. In contrast, when members of eyewear are securely fastened together, such as by conventional screw hinges and the like, similar forces tend to damage the frame front 14, the temples 18, 19, or both.

In one embodiment, the temple is a 'semi-cable' style that may be used to give variability to the length of the temple, and to provide a hook effect behind the ears, so that the glasses will be secured against the user's face despite the orientation or motion of the wearer. The semi-cable configuration can be used when a hinge configuration is such that temples 18, 19 exert limited or no lateral pressure against the sides of the wearer's head.

FIGS. 8A-8I show a partial assembly of the presently disclosed invention in which a magnetic hinge joins a frame front 14 and temple bar 18. To more clearly show the operation of the disclosed magnetic hinge, FIGS. 8A-8I do not show the first and second housings that are included in FIGS. 1-7.

Figure 8A:
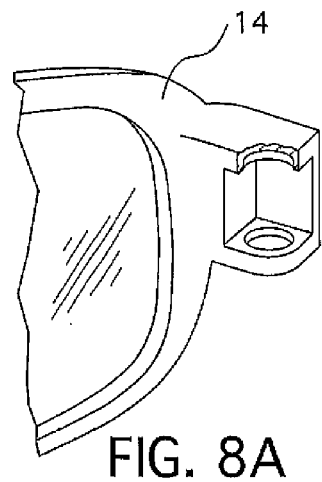
FIGS. 8A through 8I are perspective views of the magnetic hinge disclosed herein and illustrating the incorporation of magnets with several alternative shapes.
Figure 8B:
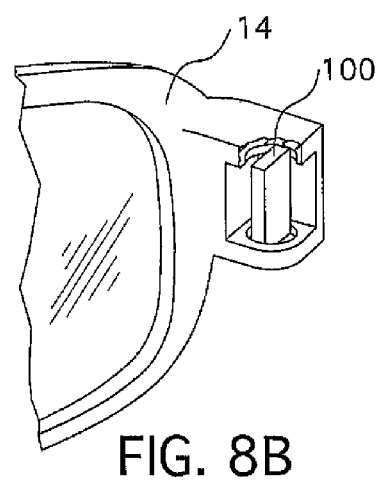
Figure 8C:
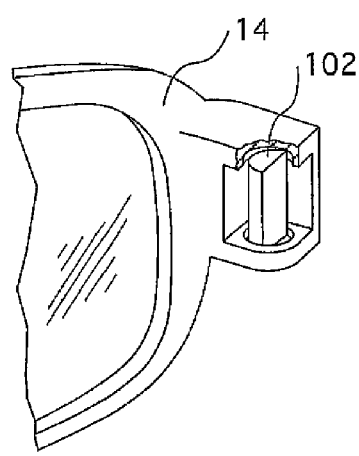

FIG. 8A shows the frame front 14 that defines a recessed area for receiving a magnet such as included in the disclosed magnetic hinge. FIGS. 8B-8I show alternative embodiments of the magnet that is included in the hinge. In FIGS. 8B, 8D, 8F and 8G the magnet 100 is in the shape of a rectangular block with the temple bar 18 in the open position (FIGS. 8B and 8D) and in the closed position (FIGS. 8F and 8G). In FIGS. 8C, 8E, 8H and 8I the magnet 102 is in the shape of one-half of a right circular cylinder with the temple bar 18 in the open position (FIGS. 8C and 8E) and in the closed position (FIGS. 8H and 8I).

Figure 8D:
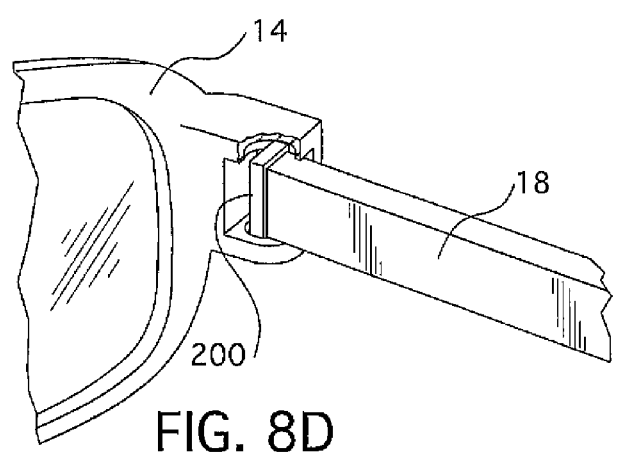
Figure 8E:
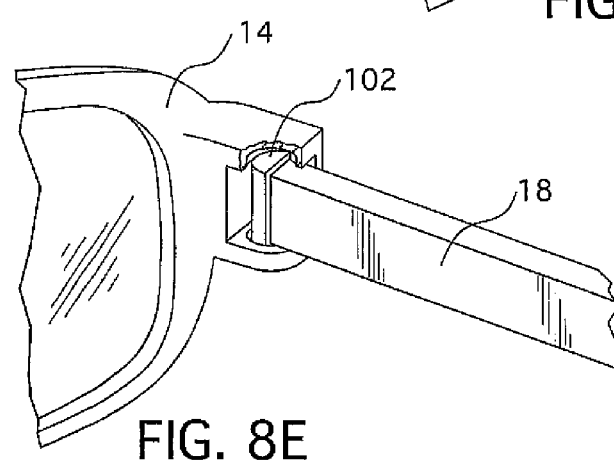
Figure 8F:
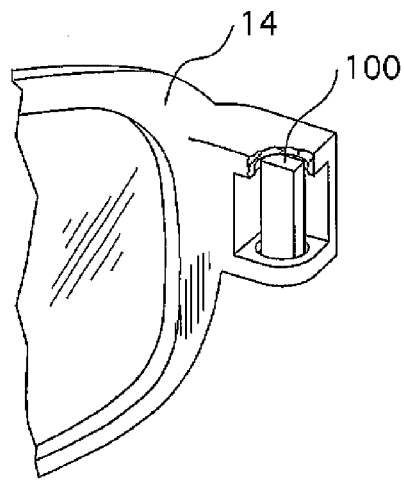
Figure 8G:
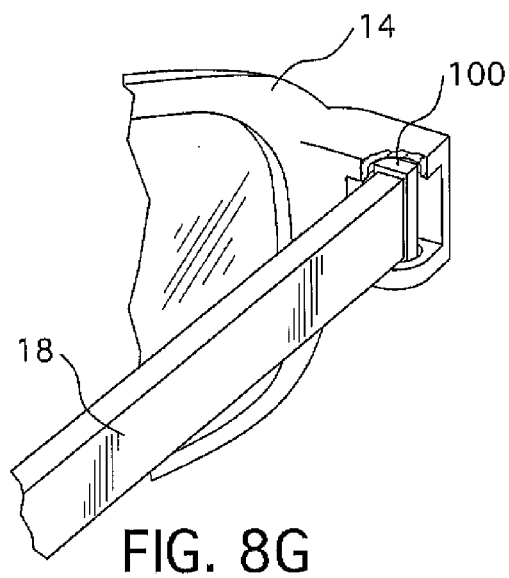
Figure 8H:
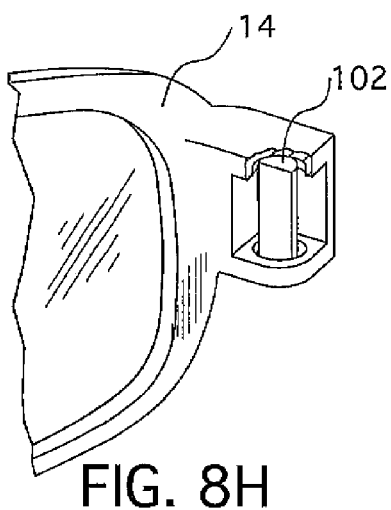
Figure 8I:
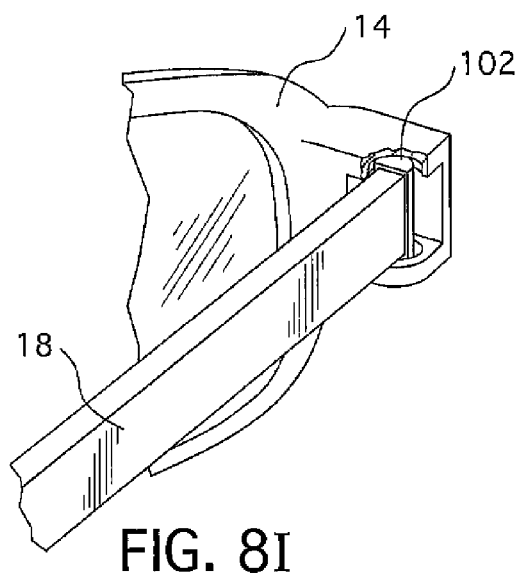

In accordance with the disclosed invention, the frame front 14 and temple bar 18 are pivoted between the open position as shown in FIGS. 8D and 8E and the closed position as shown in FIGS. 8G and 8I. In the embodiment of the rectangular block magnet 100, the pivoting action between the open and closed positions results from the angular rotation of magnet 100 between the position shown in FIG. 8B to the position shown in FIG. 8F. In the embodiment of the one-half cylindrical magnet 102, the pivoting action between the open and closed positions results from the angular rotation of magnet 102 between the position shown in FIG. 8C to the position shown in FIG. 8H.

FIGS. 9 and 10 show a further alternative embodiment in which the magnetic hinge incorporates a further adjustment for control of the pantoscopic angle, that is, the angle of the frame front 14 with respect to vertical at times when the frame 10 is being worn by the user. When the plane of frame front 14 coincides with the vertical orientation, the pantoscopic angle is zero. When the plane of frame front 14 is tilted away from vertical with the top of frame front 14 further away from the users face than the bottom of front frame 14, the frame front 14 defines a positive pantoscopic angle. When the plane of frame front 14 is tilted away from vertical with the top of front frame 14 closer to the users face than the bottom of frame front 14, the frame front defines a negative pantoscopic angle.

Figure 10A:
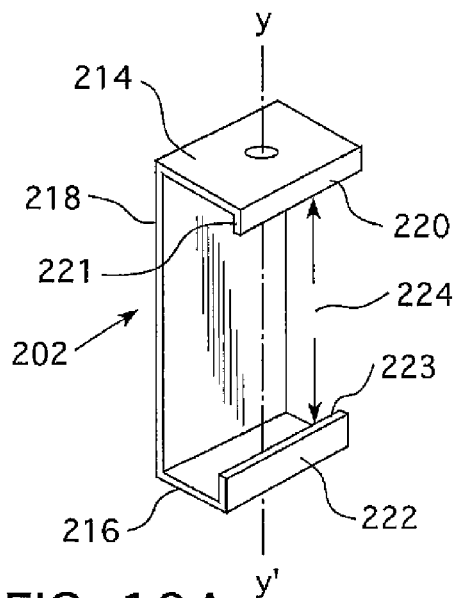
FIGS. 10A through 10H are perspective views the magnetic hinge that is shown in FIGS. 9A through 9C.
Figure 10B:
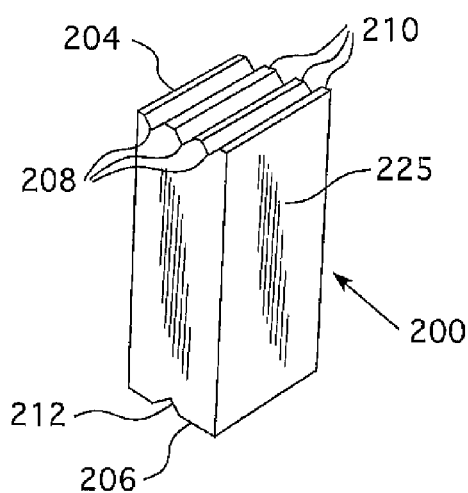

In FIGS. 10A through 10H, a grooved magnet 200 is maintained in a first housing 202 that is rotatable on an axis Y-Y'. As shown in FIG. 10B, a grooved magnet 200 is in the general shape of a rectangular block having a top surface 204 and a bottom surface 206 that is oppositely disposed from top surface 204. Top surface 204 includes an array of parallel grooves 208 separated by parallel ridges 210. Bottom surface 206 includes a groove 212. As shown in FIG. 10A, first housing 202 has a generally C-shaped profile with a top panel 214 and a bottom panel 216 extending generally orthogonally from a connecting portion 218. In addition, a top lip 220 having a distal end 221 is connected generally orthogonally to top panel 214 and a bottom lip 222 having a distal end 223 is connected generally orthogonally to bottom panel 216. Distal end 221 of top lip 220 is opposed to the distal end 223 of bottom lip 222 such that distal end 221 and distal end 223 defined a gap 224 therebetween.

In the embodiment shown in FIGS. 10A-10H, grooved magnet 200 includes a rectangular contact surface 225 that is magnetically connectable to one of temple bars 18, 19 through a magnetic reactive surface as previously explained herein. Grooved magnet 200 is maintained in first housing 202 by top lip 220 of housing 202 in engagement with one of parallel grooves 208 and bottom lip 222 of housing 202 in engagement with groove 212. The dimension of grooved magnet 200 relative to gap 224 is such that the dimension between the bottom of the parallel grooves 208 and the bottom of groove 212 is larger than the gap 224. Grooved magnet 200 is maintained between distal ends 221 and 223 of housing 202 with distal ends 223 and 221 in compression against groove 212 and one of grooves 208 respectively.

Figure 10C:
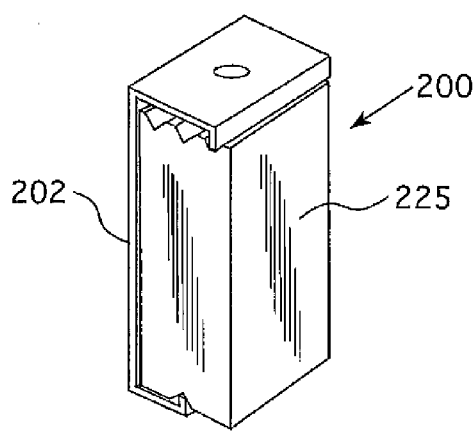
Figure 10D:
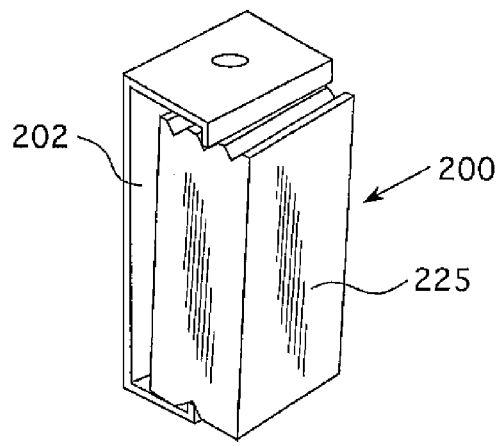
Figure 10E:
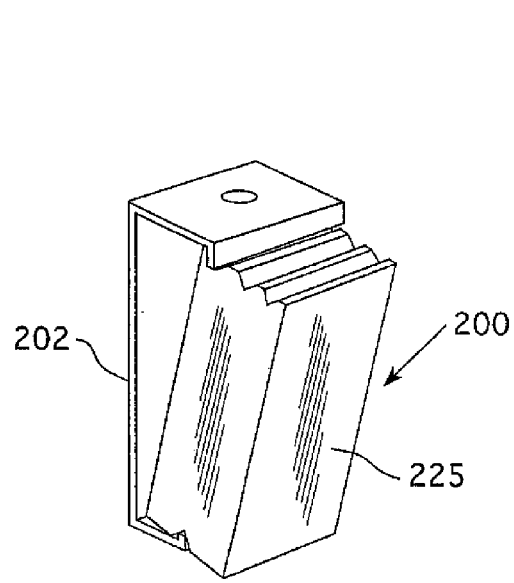

FIGS. 10C, 10D and 10E show grooved magnet 200 maintained in housing 202 with lip 220 in one of three different parallel grooves 208 and lip 222 in groove 212. In FIG. 10C, lip 220 is engaged in the groove 212 that is closest to surface 225 such that surface 225 is generally orthogonal to the surface of top panel 214 and the bottom surface of bottom panel 216. With grooved magnet 200 in this position, the pantoscopic angle is substantially zero. In FIG. 10D, lip 220 is engaged in the middle groove of three parallel grooves 212 such that surface 225 is at a slight angle compared to the position shown in FIG. 10C. The magnitude of the angle is determined by the lateral spacing between the parallel grooves 208 with respect to the spacing between grooves 208 and 212. The position shown in FIG. 10D creates a small positive pantoscopic angle for the frame 10. In FIG. 10E, lip 220 is engaged in the groove of parallel grooves 212 that is most remote from surface 225 such that surface 225 is at a greater angle from the position shown in FIG. 10D. The position shown in FIG. 10E creates a greater positive pantoscopic angle for the frame 10.

Figure 10F:
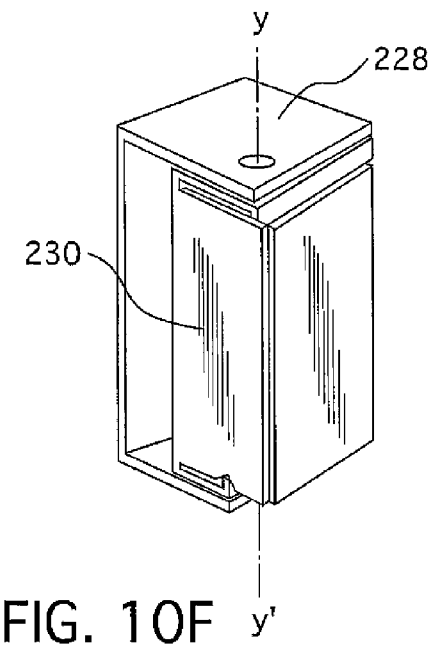
Figure 10G:
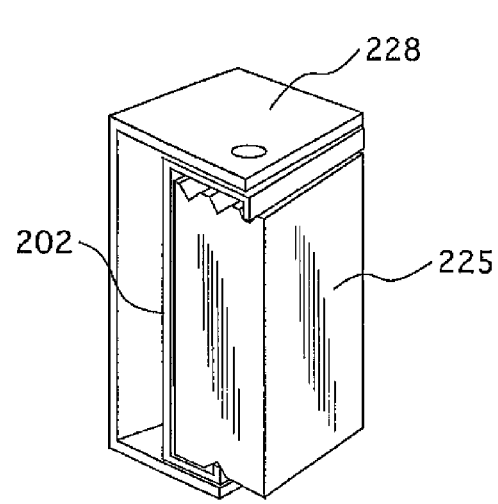
Figure 10H:
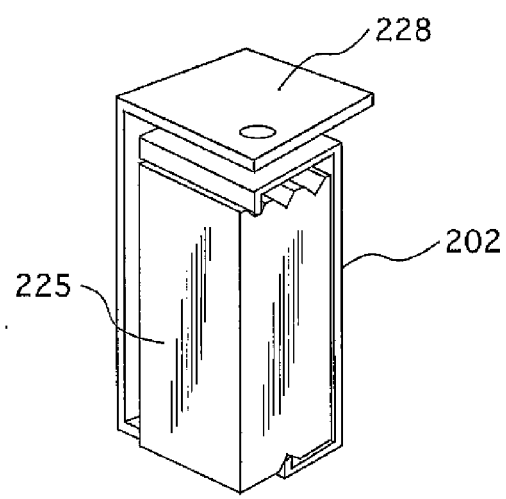

FIGS. 10F, 10G and 10H show the subassembly of grooved magnet 200 and housing 202 further combined with a second housing 228 that is rotatably connected to first housing 202 such that first housing 202 is rotatable along axis Y-Y'. Second housing 228 is secured to frame front 14 such that first housing 202 and magnet 200 are rotatable with respect to second housing 228 and frame front 14. Accordingly, surface 225 is pivotal between a first position as shown in FIG. 10G and a second position shown in FIG. 10H. In addition, a side cover 230 as shown in FIG. 10F could be added to first housing 202. Side cover 230 can be maintained in position against grooved magnet 200 by magnetic force between grooved magnet and side cover 230.

Figure 9A:
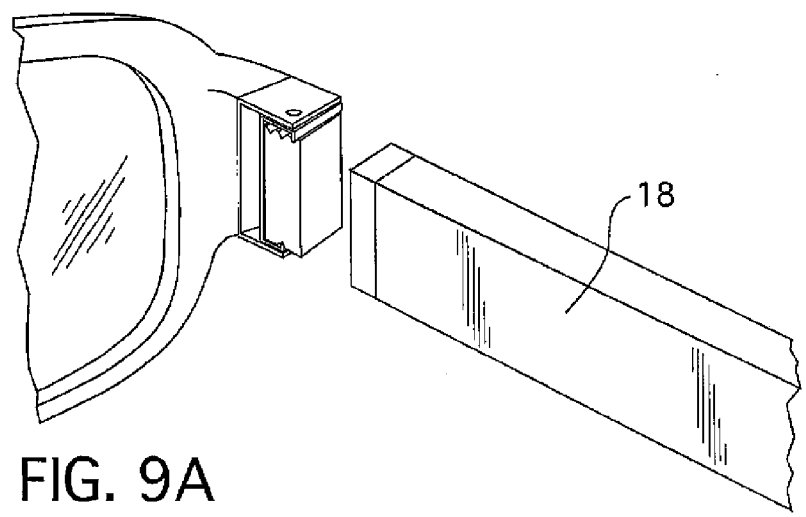
FIGS. 9A through 9C are perspective views of eyewear with an embodiment of the disclosed magnetic hinge wherein the magnetic hinge has an adjustment for the pantoscopic angle of the eyewear.
Figure 9B:
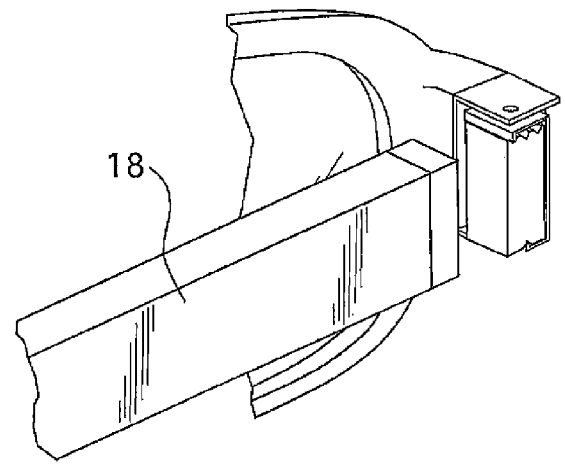
Figure 9C:
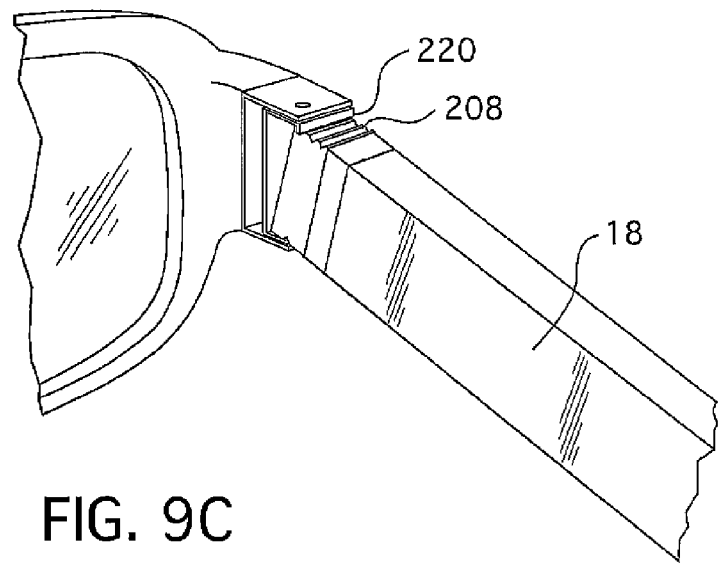

FIGS. 9A-9C show the pantoscopic angle adjustment of frame 10 in accordance with the magnetic hinge that is shown and described in connection with FIGS. 10A-10H. FIGS. 9A and 9B show frame 10 with the hinge as shown and described in connection with FIGS. 10C, 10G and 10H wherein surface 225 is substantially orthogonal to frame front 14 such that frame 10 has a substantially zero pantoscopic angle. In FIG. 9A the frame 10 is in an open position and in FIG. 9B the frame 10 is in a closed position. In FIG. 9C the hinge is adjusted so that the lip 220 is engaged with a groove 208 in accordance with the position of the magnetic hinge shown in FIG. 10E. As shown in FIG. 9C, the temple bar 18 is connected to surface 225 of grooved magnet 200 resulting in a positive pantoscopic angle for frame 10.

Figure 11A:
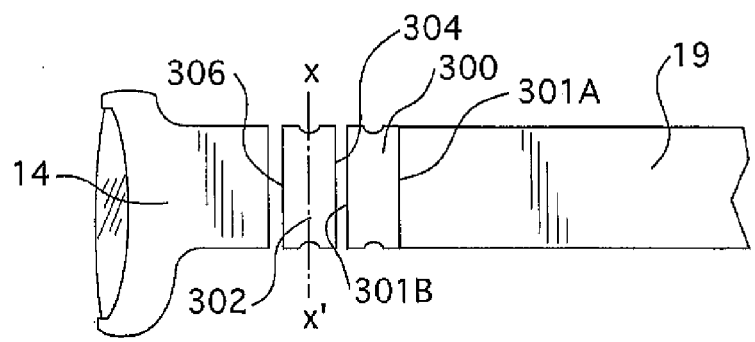
FIGS. 11A through 11D are elevation views of eyewear with an alternative embodiment of a magnetic hinge with an adjustment for the pantoscopic angle of the eyewear.

FIGS. 11A-11D show an alternative structure for a magnetic hinge in which the pantoscopic angle of frame 10 is adjustable by adjustment of the magnetic hinge. In FIGS. 11A-11D, frame front 14 is connected to temple bar 19 by means of a magnetic hinge that includes a first magnet 300 that is secured to temple bar 19. First magnet 300 has a first side 301a and a second side 301b with side 301a being in a plane that is substantially parallel to the plane that includes side 301b. In FIG. 11A, a second magnet 302 is a component of a magnetic hinge that is rotatably connected to frame front 14 in accordance with the hinge that is shown and described in connection with FIGS. 1-7. Second magnet 302 has a contact surface 304 that is in a plane that is generally parallel to the plane that includes oppositely disposed side 306 and generally parallel to a vertical direction at times when the glasses are worn by a user.

Figure 11B:
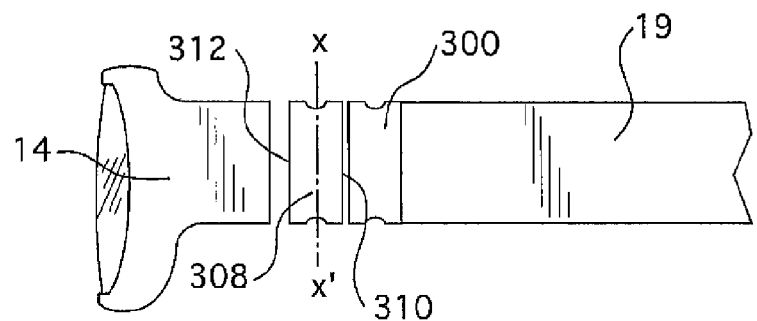
Figure 11C:
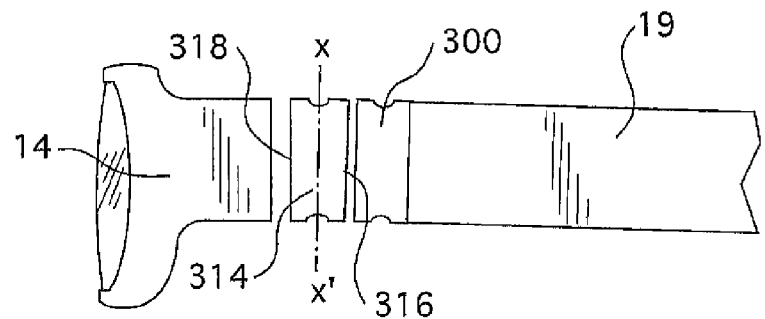
Figure 11D:
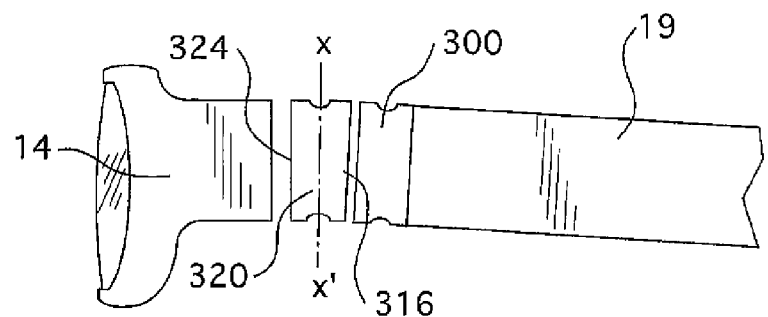

FIGS. 11B, 11C and 11D illustrate alternative embodiments of the magnetic hinge shown and described in connection with FIG. 11A wherein progressively increasing pantoscopic angles are provided. Specifically, FIG. 11B shows frame 10 wherein like numbered parts are the same as those parts described in connection with FIG. 11A. In FIG. 11B, the magnet hinge includes a magnet 308 with oppositely disposed sides 310 and 312 being in non-parallel planes that intersect along a line below the frame 10 as frame 10 is shown in FIG. 11B. Because sides 310 and 312 are non-parallel as described, the frame 10 shown in FIG. 11B has a slight positive pantoscopic angle.

The frame 10 shown in FIG. 11C is similar to the frame shown in FIG. 11B with a magnet 314 having oppositely disposed sides 316 and 318 that are in non-parallel planes that intersect in a line below the frame as frame 10 is shown in FIG. 11C. However, the sides 316 and 318 have a greater degree of convergence than sides 310 and 312 shown in FIG. 11B. Therefore, the frame 10 shown in FIG. 11C has a greater positive pantoscopic angle than the frame in FIG. 11B.

The frame shown in FIG. 11D is similar to the frames shown in FIGS. 11B and 11C with a magnet 320 having oppositely disposed sides 322 and 324 that are in non-parallel planes that intersect in a line below the frame as the frame is shown in FIG. 11D. However, the sides 322 and 324 have a greater degree of convergence than sides 310 and 312 in FIG. 11B and sides 316 and 318 in FIG. 11C. Therefore, the frame 10 shown in FIG. 11D has a greater positive pantoscopic angle than the frame in FIG. 11B or in FIG. 11C.

Figure 12A:
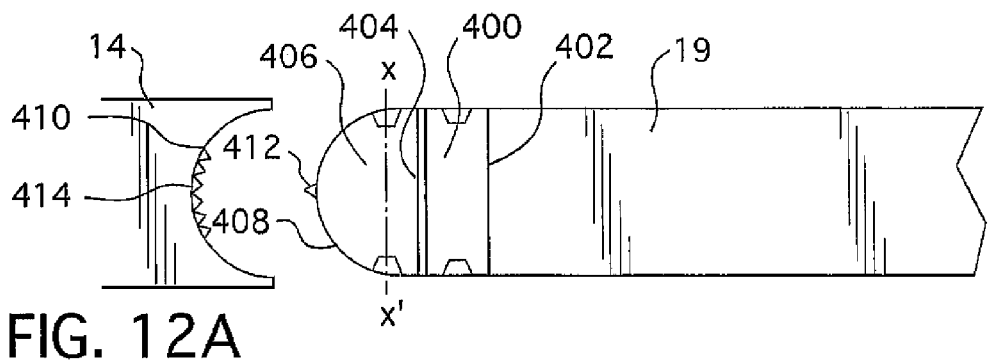
FIGS. 12A through 12D are elevation views of eyewear with another alternative embodiment of a magnetic hinge with an adjustment for the pantoscopic angle of the eyewear.
Figure 12B:
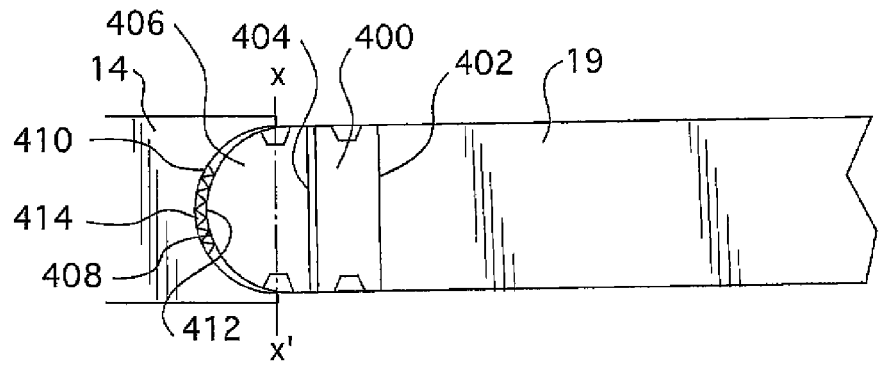
Figure 12C:
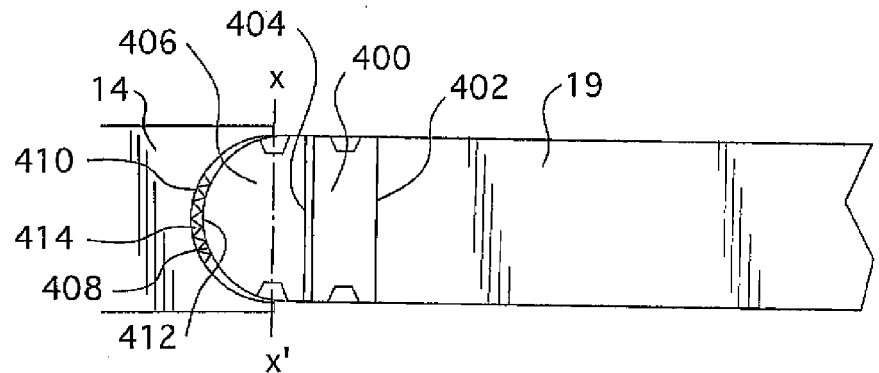
Figure 12D:
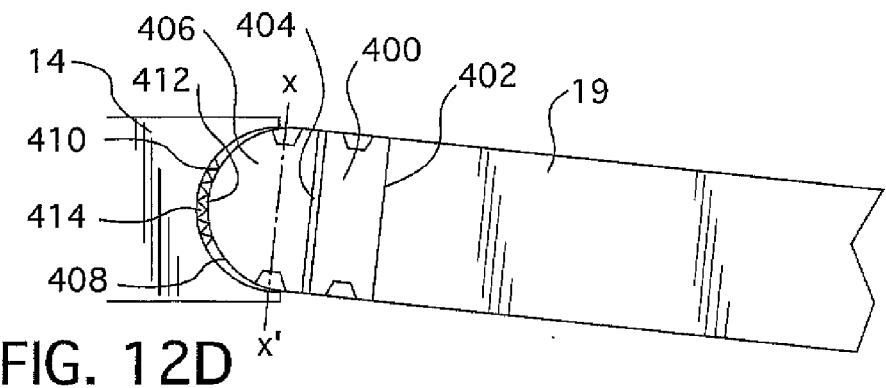

FIGS. 12A-12D show another alternative structure for a magnetic hinge in which the pantoscopic angle of frame 10 is adjustable by adjustment of the magnetic hinge. In FIGS. 12A-12D, frame front 14 is connected to temple bar 19 by means of a magnetic hinge that includes a first magnet 400 that is secured to temple bar 19. First magnet 400 has a first side 402 and a second side 404 with side 402 being in a plane that is substantially parallel to the plane of side 404. In FIG. 12A, a second magnet component 406 is a component of a magnetic hinge. Second magnet component 406 is rotatably connected to frame front 14 in accordance with the hinge that is shown and described in connection with FIGS. 1-7. Second magnet component 406 has a convex surface 408 that is complementary to a concave surface 410 of frame front 14 with the radius of curvature of convex surface 408 equivalent to the radius of curvature of concave surface 410. Convex surface 408 includes a detent 412 and concave surface 410 includes an array of receiving detents 414 that are located in a segment of concave surface 410. Receiving detents 414 cooperate with detent 412 to resist lateral movement of convex surface 408 with respect to concave surface 410 such that first magnet 400 and temple bar 19 are angularly adjustable with respect to frame front 14.

Convex surface 408 of second magnet component 406 is moveable with respect to concave surface 410 of frame front 14 to pivot second magnet component 406 about an axis that is substantially orthogonal to the axis of rotation X-X' of second magnet component 406. The detent 412 and the reciprocal detent 414 opposing the pivotal movement of second magnet component 406 about the orthogonal axis such that the engagement of detent 412 and reciprocal detent 414 determines the pantoscopic angle adjustment for the magnetic hinge. Specifically, second magnet component 406 is magnetically coupled to magnet 400 such that a sufficient force will separate magnet 400 from second magnet component 406 in the manner of the magnetic hinge that is described in connection with FIGS. 1 through 7. The movement and positioning of surfaces 408 and 410 determines the pantoscopic angle of frame 10. In the magnetic hinge of FIGS. 12A through 12D, the pantoscopic angle is adjusted by applying sufficient torque to temple bar 19 and frame front 14 to overcome the resistance between detent 412 and receiving detents 414 to laterally move the relative positions of convex surface 408 and concave surface 410.

Figure 13A:
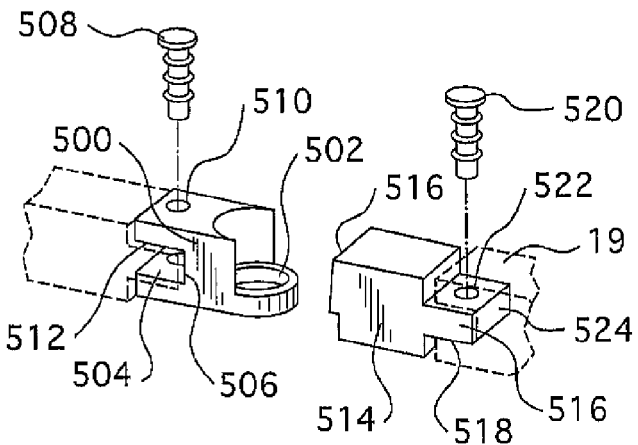
FIGS. 13A through 13F are perspective views of magnetic hinges that can be used to retrofit traditional eyewear with magnetic hinges.

FIGS. 13A through 13F show a magnetic hinge that can be fitted to existing eyeglass frames. FIG. 13A illustrates a partial assembly of the magnetic hinge without the magnetic component. FIG. 13A shows a first hinge part 500 that defines a pocket 502 for receiving the magnet (not shown in FIG. 13A). First hinge part 500 is connected to the frame front 14 (shown in phantom) by a fitted joint such as a tongue and groove joint in which a tongue 504 of the frame front 14 (shown in phantom) is received in a groove 506 in the body of the first hinge part 500. Tongue 504 is maintained in groove 506 by a pin 508 that passes through vertically aligned holes 510 in the body of first binge part 500 and also through a hole 512 in tongue 504.

A second hinge part 514 includes a face 516 that is magnetically connectable to a magnet (not shown in FIG. 13A) that is rotatably secured in pocket 502 of first hinge part 500. Second hinge part 514 is secured to temple 19 by a tongue and groove joint in which a tongue 516 that is formed in the body of second hinge part 514 is received in a groove 518 that is formed in temple 19 (shown in phantom). A pin 520 is insertable in vertically aligned holes 522 in temple 19 and through a hole 524 in second hinge part 514 to secure second hinge part 514 to temple 19.

Figure 13B:
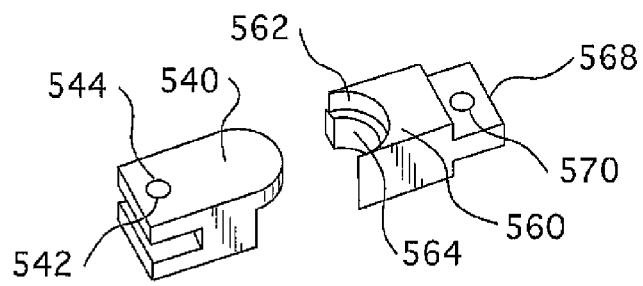
Figure 13C:
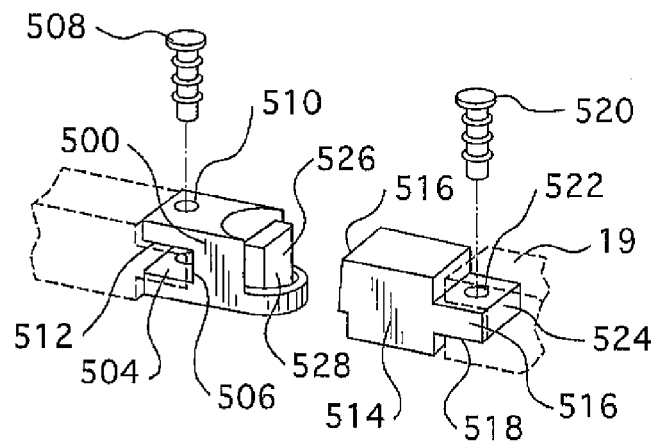

FIG. 13C shows the portions of the magnetic hinge shown in FIG. 13A together with a magnet 526 that is rotatably mounted in pocket 502. In the embodiment of FIG. 13C, the magnet 526 is in the general form of a rectangular block. Magnet 526 has a face surface 528 that is arranged for contacting the face 516 of second hinge part 514 such that magnet 526 and second hinge part 514 are magnetically connected together. Because magnet 526 is rotatably connected to first hinge part 500, frame front 14 and temple 19 remain pivotally connected so that they can move between an open position and a closed position as long as first hinge part 500 is magnetically connected to the second hinge part 514. If a force is applied against the eyewear shown in FIG. 13C sufficient to dislodge magnet 526 from second hinge part 514, the temple 19 is separated from the frame front 14.

Figure 13D:
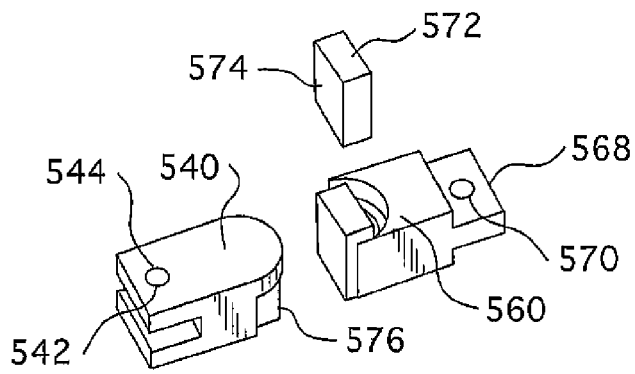
Figure 13E:
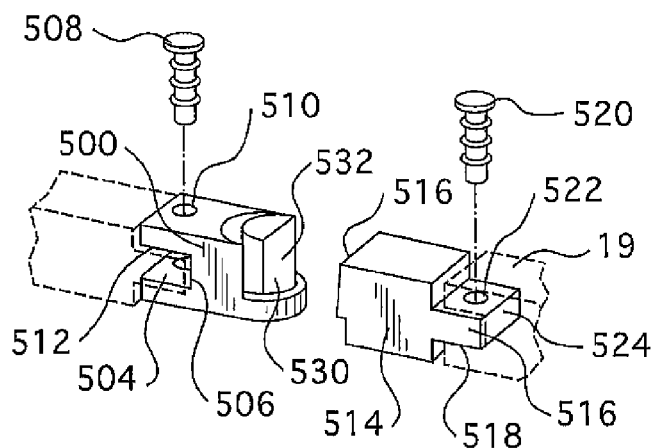

FIG. 13E shows an alternative embodiment of the magnetic hinge shown in FIG. 13C in which a half-cylindrical magnet 530 replaces the rectangular block magnet 526 that is shown in FIG. 13C. In the embodiment of FIG. 13E, half-cylindrical magnet 530 is rotatably connected to first hinge part 500. Half-cylindrical magnet 530 includes a face 532 that engages the face 516 of second hinge part 514 so that first hinge part 500 and second hinge part 514 are pivotally connected and move between an open position and a closed position. Frame front 14 and temple 19 remain pivotally connected so that they can move between the open position and closed positions as long as second hinge part 514 is magnetically connected to the half-cylindrical magnet 530. If a force is applied against the eyewear shown in FIG. 13E sufficient to dislodge magnet 530 and second hinge part 514, the temple 19 will be separated from the frame front 14.

Figure 13F:
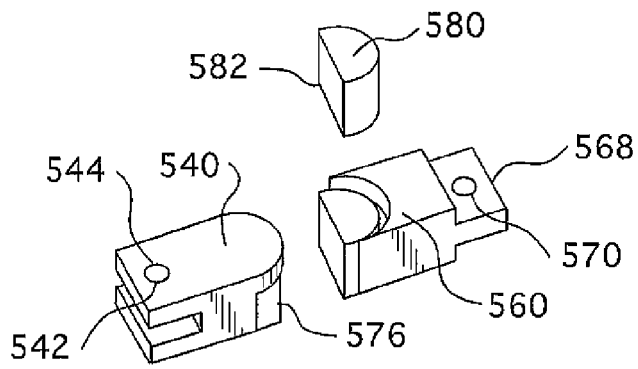

FIGS. 13B, 13D and 13F illustrate a partial assembly of another embodiment of the magnetic hinge disclosed herein in which the hinge parts are modified from the first and second hinge parts 500 and 514 that are shown in FIGS. 13A, 13C and 13E. FIG. 13B is a partial assembly that shows the portions of the magnetic hinge without the magnetic component. FIG. 13B shows a first hinge part 540 that can be connected either to the frame front 14 or the temple 19 by a fitted joint such as a tongue and groove joint in which a tongue (not shown) of the frame front 14 or temple 19 is received in a groove 542 in the body of the first hinge part 540. The tongue of the eyewear is maintained in groove 542 by a pin of the type shown in FIGS. 13A, 13C and 13E. The pin passes through vertically aligned holes 544 in the body of first hinge part 540 and also through a hole in the tongue of the eyewear component that is secured to first hinge part 540.

A second hinge part 560 includes a concave face 562 that that defines a pocket 564 for receiving a magnet (not shown in FIG. 13B) that is rotatably lodged in pocket 564 of second hinge part 560. Second hinge part 560 is secured to frame front 14 or temple 19 by a tongue and groove joint in which a tongue 568 that is formed in the body of second hinge part 560 is received in a groove in frame front 14 or temple 19 (not shown). A pin is insertable in vertically aligned holes in frame front 14 or temple 19 and through a hole 570 in second hinge part 560 to secure second hinge part 560 to frame front 14 or temple 19.

FIG. 13D shows the portions of the magnetic hinge shown in FIG. 13B together with a magnet 572 that is rotatably mounted in pocket 564 of second hinge part 560. In the embodiment of FIG. 13D, the magnet 572 is in the general form of a rectangular block. Magnet 572 has a face surface 574 that is arranged for contacting a face 576 on the body of first hinge part 540 such that magnet 572 and first hinge part 540 are magnetically connected together. Because magnet 572 is rotatably connected to second hinge part 560, second hinge part 560 and first hinge part 540 remain pivotally connected so that they can move between an open position and a closed position as long as first hinge part 540 is magnetically connected to the magnet 572. If a force is applied against the eyewear shown in FIG. 13D sufficient to dislodge magnet 572 from first hinge part 540, temple 19 is separated from the frame front 14.

FIG. 13F shows an alternative embodiment of the magnetic hinge shown in FIG. 13D in which a half-cylindrical magnet 580 replaces the rectangular block magnet 572 that is shown in FIG. 13D. In the embodiment of FIG. 13F, half-cylindrical magnet 580 is rotatably connected to second hinge part 560. Half-cylindrical magnet 580 includes a face 582 that engages the face 576 of first hinge part 540 so that first hinge part 540 and second hinge part 560 are pivotally connected and move between an open position and a closed position. First hinge part 540 and second hinge part 560 remain pivotally connected so that they can move between an open position and a closed position as long as first hinge part 540 is magnetically connected to the half-cylindrical magnet 580. If a force is applied against the eyewear shown in FIG. 13F sufficient to dislodge magnet 580 and first hinge part 540, the temple 19 will separate from frame front 14.

While the foregoing has been set forth in considerable detail, it is to be understood that the scope of the subject invention is not limited to the particular drawings, detailed embodiments, and examples. Design variations, especially in matters of shape, size, and arrangements of parts, may be made within the principles of the invention. Those skilled in the art will realize that such changes or modifications of the invention or combinations of elements, variations, equivalents, or improvements therein are still within the scope of the invention as defined in the appended claims.

I claim:

1. A magnetic hinge assembly for pivotally connecting a frame front to a temple, said hinge assembly comprising:
   a magnet that is rotatably mounted to one of said frame front and said temple, said magnet rotating about an axis with respect to one of said frame front and said temple, said magnet having at least one contact surface;
   a magnetically responsive body that is secured to the other of said frame front and said temple, said magnetically responsive body having a surface that engages the contact surface of said magnet at times when said magnet holds said magnetically responsive body against said magnet, said magnetic hinge pivotally connecting said frame front and said temple at times when the surface of said magnetically responsive body engages the contact surface of said magnet; and
   a first housing that that has a top panel that is rotatably connected to one of said frame front and said temple, said first housing also having a bottom panel that is connected to the same one of said frame front and said temple as said top panel, said bottom panel being disposed oppositely on said first housing from said top panel, said magnet being secured between the top panel and the bottom panel of said first housing.

2. The magnetic hinge of claim 1 wherein said magnet has a first side with a detent feature, and wherein said first housing has one side that opposes the first side of said magnet and a reciprocal detent feature that is complementary to the detent feature of the first side of said magnet to secure said magnet in said first housing.

3. The magnetic hinge of claim 2 wherein said magnet has a second side that also has a detent feature, and wherein said first housing has a second side that opposes the second side of said magnet and a reciprocal detent feature that is complementary to the detent of the second side of said magnet.

4. The magnetic hinge of claim 3 wherein said second side of said magnet is oppositely disposed on said magnet from said first side of said magnet.

5. The magnetic hinge of claim 4 wherein the detent feature in the first side of said magnet is a groove in the side of said magnet.

6. The magnetic hinge of claim 5 wherein the reciprocal detent feature in the first side of said first housing is a ridge that engages the groove in the first side of said magnet.

7. The magnetic hinge of claim 6 wherein the detent feature in the second side of said magnet is a groove in the second side of said magnet.

8. The magnetic hinge of claim 7 wherein the reciprocal detent feature in the second side of said first housing is a ridge that engages the groove in the second side of said magnet.

9. The magnetic hinge of claim 1 wherein the top panel of said first housing includes a top protrusion from the top panel and wherein the bottom panel of said first housing includes a bottom protrusion from the bottom panel, said first housing being rotatably connected to said one of said front frame and said temple by said top protrusion and said bottom protrusion.

10. The magnetic hinge of claim 9 and further comprising a second housing that is secured to one of said front frame and said temple, said second housing defining a compartment for receiving said first housing.

11. The magnetic hinge of claim 10 wherein said second housing has a first protrusion that receives the top protrusion of said top panel and wherein said second housing also has a second protrusion that receives the bottom protrusion of said bottom panel, the first protrusion and the second protrusion of said second housing contacting one of said front frame and said temple to rotatably connect said magnet to the one of said front frame and said temple.

12. The magnetic hinge of claim 11 wherein said first and second protrusions and said top and bottom protrusions are aligned on the axis of rotation of the magnet.

13. The magnetic hinge of claim 12 further comprising a stop that is secured to said second housing, said stop limiting the rotation of said inner housing about said axis.

14. The magnetic hinge of claim 10 wherein said second housing a first end member and a second end member that are oppositely disposed on said second housing, said second housing further including a side wall that is connected between said first end member and said second end member and that cooperates with said first end member and said second end member to define said compartment of said second housing.

15. The magnetic hinge of claim 1 wherein said magnet includes a pantoscopic angle adjustment wherein said magnet has one end that includes a plurality of parallel grooves and wherein one of said top panel and said bottom panel of said first housing engages one of said parallel grooves of said magnet to determine the pantoscopic angle adjustment for said magnetic hinge.

16. A magnetic hinge for pivotally connecting a frame front to a temple, said hinge comprising:
   a magnet that is rotatably mounted to one of said frame front and said temple, said magnet rotating about an axis with respect to one of said frame front and said temple, said magnet having at least one contact surface; and
   a magnetically responsive body that is secured to the other of said frame front and said temple, said magnetically responsive body having a surface that engages the contact surface of said magnet at times when said magnet holds said magnetically responsive body against said magnet, said magnetic hinge pivotally connecting said frame front and said temple at times when the surface of said magnetically responsive body engages the contact surface of said magnet, said hinge further including a surface having a detent and wherein said one of said frame front and said temple have a surface that opposes said surface of said hinge and that includes a reciprocal detent that engages the detent of said opposing surface of said hinge, the opposing surface of said hinge being moveable with respect to the opposing surface of said one of said frame front and said temple to pivot the hinge about an axis that is substantially orthogonal to the axis of rotation of said magnet, said detent and said reciprocal detent opposing the pivotal movement of said hinge about said orthogonal axis such that the engagement of the detent and the reciprocal detent determines the pantoscopic angle adjustment for said magnetic hinge.

17. A magnetic hinge for pivotally connecting a frame front to a temple, said hinge comprising:
   a magnet that is rotatably mounted to one of said frame front and said temple, said magnet rotating about an axis with respect to one of said frame front and said temple, said magnet having at least one contact surface; and
   a magnetically responsive body that is secured to the other of said frame front and said temple, said magnetically responsive body having a surface that engages the contact surface of said magnet at times when said magnet holds said magnetically responsive body against said magnet, said magnetic hinge pivotally connecting said frame front and said temple at times when the surface of said magnetically responsive body engages the contact surface of said magnet, said frame front having a terminal surface with a given contour and wherein said temple has a terminal surface with a given contour, said hinge having a surface that defines a contour that is complementary to the contour of one of the terminal surface of said frame front and the terminal surface of said temple and wherein said magnetically responsive body defines a contour that is complementary to one of the terminal surface of the other of said frame front and the terminal surface of said temple such that said magnetic hinge is connectable to one of the terminal surface of said frame front and the terminal surface of said temple and the magnetically responsive body is connectable to the other of the terminal surface of said frame front and the terminal surface of said temple.

* * * * *